US 9,247,296 B2

(12) United States Patent
Botta et al.

(10) Patent No.: US 9,247,296 B2
(45) Date of Patent: Jan. 26, 2016

(54) METHOD FOR SETTING A WATCHING LEVEL FOR AN AUDIOVISUAL CONTENT

(71) Applicant: THOMSON LICENSING, Issy de Moulineaux (FR)

(72) Inventors: Franck Botta, Osse (FR); Patrick Gallardo, Vendel (FR); Cedric Penet, Rennes (FR); Claire-Helene Demarty, Montreuil le Gast (FR)

(73) Assignee: Thomson Licensing (FR)

( * ) Notice: Subject to any disclaimer, the term of this patent is extended or adjusted under 35 U.S.C. 154(b) by 184 days.

(21) Appl. No.: 13/846,743

(22) Filed: Mar. 18, 2013

(65) Prior Publication Data
US 2013/0254795 A1    Sep. 26, 2013

(30) Foreign Application Priority Data
Mar. 23, 2012 (EP) .................................. 12305336

(51) Int. Cl.
  H04N 7/167     (2011.01)
  H04N 21/454    (2011.01)
  H04N 21/475    (2011.01)
  H04N 21/845    (2011.01)
  G11B 27/32     (2006.01)

(52) U.S. Cl.
  CPC .......... H04N 21/4542 (2013.01); G11B 27/322 (2013.01); H04N 21/4751 (2013.01); H04N 21/4756 (2013.01); H04N 21/8456 (2013.01)

(58) Field of Classification Search
  CPC .......... H04N 21/4542; H04N 21/4756; H04N 21/4751; H04N 21/8456
  USPC ........................................................ 725/28
  See application file for complete search history.

(56) References Cited

U.S. PATENT DOCUMENTS

| 5,778,135 | A  |   | 7/1998  | Ottesen et al. |
| 6,072,520 | A  | * | 6/2000  | Yuen et al. ...................... 725/27 |
| 6,112,186 | A  | * | 8/2000  | Bergh et al. .................. 705/7.32 |
| 6,115,057 | A  | * | 9/2000  | Kwoh et al. .................... 725/28 |
| 6,226,793 | B1 | * | 5/2001  | Kwoh .............................. 725/28 |
| 6,662,365 | B1 | * | 12/2003 | Sullivan et al. ................. 725/25 |
| 6,684,240 | B1 | * | 1/2004  | Goddard ....................... 709/217 |
| 7,089,576 | B1 | * | 8/2006  | Lynch ............................. 725/25 |

(Continued)

FOREIGN PATENT DOCUMENTS

| CN | 1787631   | 6/2006 |
| CN | 101189881 | 5/2008 |

(Continued)

OTHER PUBLICATIONS

Search Rept: Aug. 6, 2012.

(Continued)

*Primary Examiner* — Nasser Goodarzi
*Assistant Examiner* — Michael B Pierorazio
(74) *Attorney, Agent, or Firm* — Jack Schwartz & Associates, PLLC

(57) ABSTRACT

The invention discloses a method for setting a watching level to an audiovisual content which some frames are already annotated with watching levels. Upon the reception of the audiovisual content, frames annotated with watching levels are extracted and displayed in a single view. One of the displayed frames is selected by the user, the watching level of the selected frame being set as watching level to the audiovisual content.

19 Claims, 2 Drawing Sheets

(56) References Cited

U.S. PATENT DOCUMENTS

| | | |
|---|---|---|
| 7,210,158 B1 * | 4/2007 | Forler .............................. 725/31 |
| 7,313,803 B1 * | 12/2007 | Lynch .............................. 725/25 |
| 7,430,360 B2 * | 9/2008 | Abecassis ..................... 386/343 |
| 7,739,706 B2 * | 6/2010 | Gonzales-Caiazzo et al. . 725/25 |
| 7,950,032 B1 * | 5/2011 | Lynch .............................. 725/28 |
| 8,185,921 B2 * | 5/2012 | Candelore ............ H04N 5/4401 348/435.1 |
| 8,225,345 B2 * | 7/2012 | Sahasrabudhe et al. ........ 725/30 |
| 8,689,250 B2 * | 4/2014 | Bhide et al. ..................... 725/28 |
| 8,850,469 B1 * | 9/2014 | Yang ............................... 725/28 |
| 2003/0046638 A1 * | 3/2003 | Thompson .................... 715/500 |
| 2005/0028191 A1 * | 2/2005 | Sullivan et al. ................. 725/28 |
| 2006/0064733 A1 * | 3/2006 | Norton et al. ................. 725/135 |
| 2006/0130118 A1 | 6/2006 | Damm |
| 2006/0130119 A1 | 6/2006 | Candelore et al. |
| 2006/0233242 A1 | 10/2006 | Wang et al. |
| 2007/0033610 A1 * | 2/2007 | Sohn ................. H04N 5/44543 725/28 |
| 2007/0055980 A1 | 3/2007 | Megeid et al. |
| 2007/0124762 A1 * | 5/2007 | Chickering et al. ............ 725/35 |
| 2007/0143778 A1 * | 6/2007 | Covell et al. .................... 725/19 |
| 2007/0150916 A1 * | 6/2007 | Begole et al. ................... 725/10 |
| 2007/0204288 A1 * | 8/2007 | Candelore ....................... 725/28 |
| 2008/0040380 A1 | 2/2008 | Miyaki |
| 2008/0089672 A1 * | 4/2008 | Gould et al. .................. 386/124 |
| 2008/0145025 A1 * | 6/2008 | Wimberly et al. .............. 386/95 |
| 2009/0080852 A1 * | 3/2009 | Peters ............................. 386/52 |
| 2009/0089827 A1 * | 4/2009 | Carlsgaard et al. ............. 725/28 |
| 2009/0089828 A1 * | 4/2009 | Carlsgaard et al. ............. 725/28 |
| 2009/0249176 A1 | 10/2009 | Jarman |
| 2010/0088735 A1 * | 4/2010 | Sadja et al. ................... 725/109 |
| 2010/0095321 A1 | 4/2010 | Shibahara |
| 2010/0333132 A1 * | 12/2010 | Robertson et al. .............. 725/32 |
| 2012/0117585 A1 * | 5/2012 | Curtis et al. ..................... 725/25 |
| 2013/0055084 A1 | 2/2013 | Soroushian et al. |
| 2013/0326561 A1 * | 12/2013 | Pandey ............................ 725/58 |
| 2014/0007150 A1 * | 1/2014 | Bhide et al. ..................... 725/14 |

FOREIGN PATENT DOCUMENTS

| | | |
|---|---|---|
| CN | 101861583 | 10/2010 |
| WO | WO02/089473 | 11/2002 |

OTHER PUBLICATIONS

Bermejo et al.: "Violence Detection in Video Using Computer Vision Techniques"; Proceedings of the 14th International Conference on Computer Analysis of Images and Patterns; vol. Part II, Springer-Verlag, 2011, pp. 332-339.

Ling-Hua Chen et al. "Violence Detection in Movies" 2011 Eighth International Conference Computer Graphics, Imaging and Visualization, 978-0-7695-4484-7/11 2011 IEEE, DOI: 10.1109/CGIV.2011.14.

Claire-Helene Demarty et al. "A Benchmarking Campaign for the Multimodal Detection of Violent Scenes in Movies", ECCV. Workshop on Information Fusion in Computer Vision for Concept Recognition, Oct. 2012.

Giannakopoulos et al: "Audio-visual fusion for detecting violent scenes in videos"; Artificial Intelligence: Theories, Models and Applications, Lecture Notes in Computer Science, 2010, vol. 6040/2010, pp. 91-100.

Yu Gong et al. "Detecting Violent Scenes in Movies by Auditory and Visual Cues" Y-MR Huang et all (EDs): PCM 2008, LNCS 5353, pp. 317-326, 2008.

Jian Lin et al., "Weakly-Supervised Violence Detection in Movies with Audio and Video Based Co-Training", P. Muneesawang et al. (Edc): PCM 2009, LNCS 5879, pp. 930-935, 2009, Springer-Verlag Berlin Heidelberg 2009.

Fillipe D. M. De Souza, "Violence Detection in Video Using Spatio-Temporal Features" 2010 23rd SIBGRAPI—Conference on Graphics, Patterns and Images, 1530-1834/10, 2010 IEEE, DOI 10.1109/SIBGRAPI:2010.38.

\* cited by examiner

METHOD FOR SETTING A WATCHING LEVEL FOR AN AUDIOVISUAL CONTENT

This application claims the benefit, under 35 U.S.C. §119 of European Patent Application 12305336.5, filed Mar. 23, 2012.

TECHNICAL FIELD

The invention relates to the field of assisted parental control, and more specifically to assisted parental control applied to audiovisual contents.

BACKGROUND

In order to prevent children from watching inappropriate audiovisual contents, several technical solutions have been proposed in the past. One solution consists in adding a logo superimposed on the video so as to indicate to the viewer the possible offensive nature of the content he is going to watch. The logo can indicate a rating according to a rating system, such as the Motion Picture Association of America rating System (MPAA) for example. However, whatever the precision of the adopted rating system, as a normative system, not all people would give the same rating to the same audiovisual content, because people have different sensitivities. Moreover, the rating system is nothing more than a least common denominator. Ideally, the parent should watch the whole audiovisual content before to form an opinion on whether the audiovisual content is appropriate for his children. The problem is that it takes much time, which makes this solution not realistic. It shows however how much the audiovisual content itself is important to rate the audiovisual content. Based on the common saying "An image is worth a thousand words", another solution, described in the patent U.S. Pat. No. 6,684,240, consists in setting parental lock levels based on example content. An example extracted of the audiovisual content 102 is shown to the user, and, based on that example, the user decides to block the watching of the audiovisual content or not. When the audiovisual content contains in its metadata a rating, then this rating is retained for future use. When a further audiovisual content having a similar rating is broadcast, this audiovisual content is automatically blocked. This solution has the advantage that the parent does not need to know the signification of the ratings, which may be numerous and complicated, because the example content has shown him directly this signification. It may however happen that two audiovisual contents similarly rated by a rating system, for example on a violence scale, are perceived differently by the same person. It may also happen that the audiovisual content is not rated at all. In such cases, the parent has to come back to the old solution consisting in watching the whole audiovisual content, but again, the parent has no time for that. In the end, the parent has to choose between two solutions, either watching the whole audiovisual content to form an opinion, or relying on a relatively unreliable rating system.

SUMMARY OF THE INVENTION

It is proposed a method for setting a watching level for an audiovisual content, wherein the audiovisual content contains a plurality of frames respectively associated to a plurality of watching levels, the method comprising the steps of displaying two or more frames from the plurality of frames, selecting a frame from the displayed frames and setting the watching level for the audiovisual content to the watching level associated to the selected frame.

This way, a single view of frames representative of the audiovisual content is generated. As a consequence of the single view, the user is able to take a decision more quickly on which is the right watching level to set.

Preferably, the frame from the two or more displayed frames is associated to an audiovisual segment of the audiovisual content.

Advantageously, the audiovisual segment of the audiovisual content may be played back upon the introduction of a command, or upon the displaying step. This allows the user to check in a more detailed manner whether or not the associated watching level corresponds to what he expected.

Advantageously, several frames from the two or more displayed frames are respectively associated to audiovisual segments of the audiovisual content.

Preferably, the audiovisual segments are played back simultaneously upon the displaying step, and optionally upon the introduction of a command.

Optionally, the watching level associated to each of the frames is determined automatically. Alternatively, it may be inputted manually.

Advantageously, the method comprises a previous step of setting an initial watching level. This initial watching level may then be used by the user to compare the content of the audiovisual content with the content of audiovisual contents watched before.

Preferably, the two or more frames are displayed in an increasing watching level order. This way, the user gets a quick look of the range of offensiveness of displayed frames.

Advantageously, a frame belonging to the two or more frames and associated to a watching level higher than the initial watching level is displayed blurred. This way, the user is not exposed to a content too offensive for him.

DETAILED DESCRIPTION OF PREFERRED EMBODIMENTS

For a better understanding, the invention shall now be explained in more detail in the following description with reference to the figures. It is understood that the invention is not limited to the described embodiments and that specified features can also expediently be combined and/or modified without departing from the scope of the present invention as defined in the appended claims.

Figure 1:
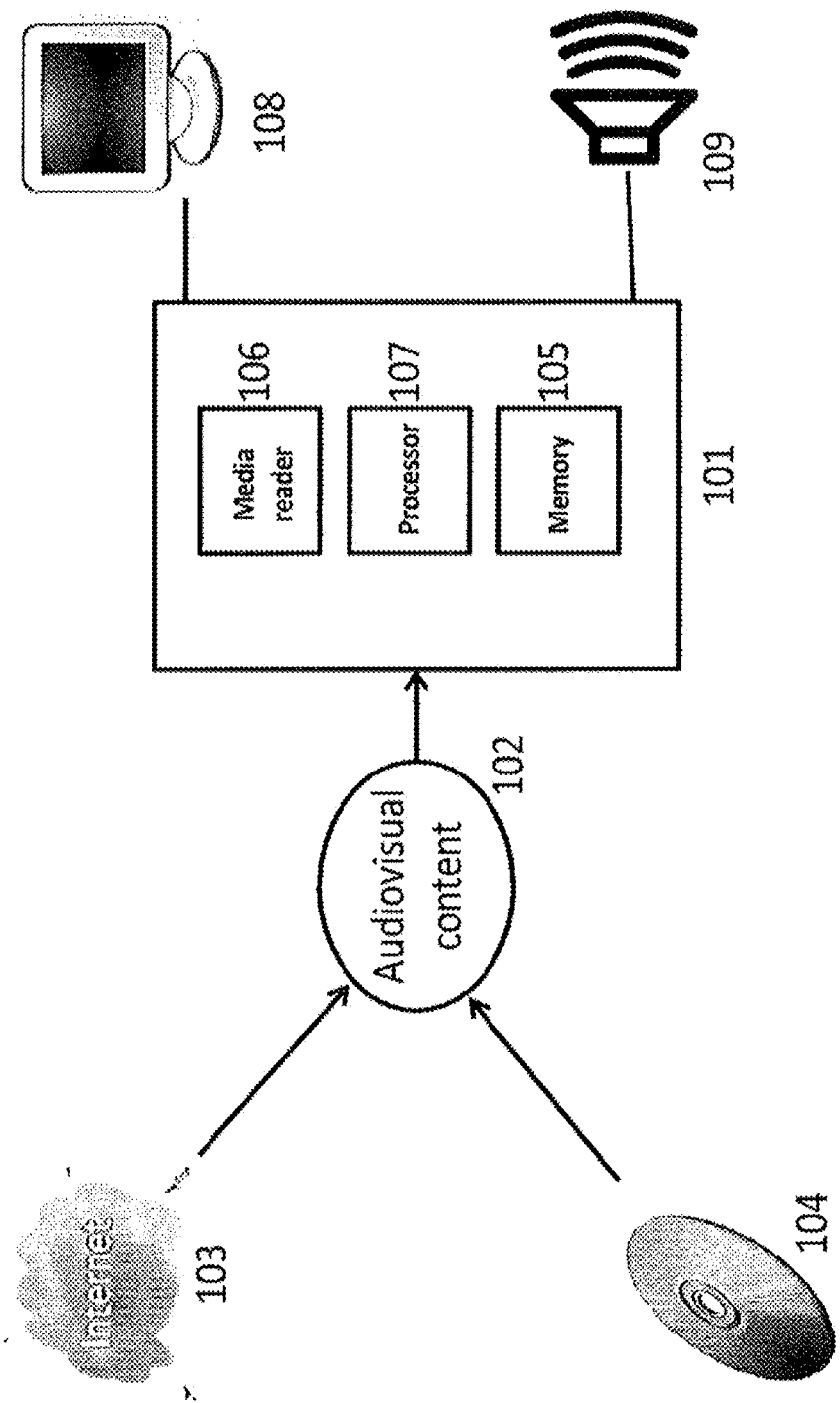
FIG. 1 shows a system allowing the invention to be implemented
Figure 2:
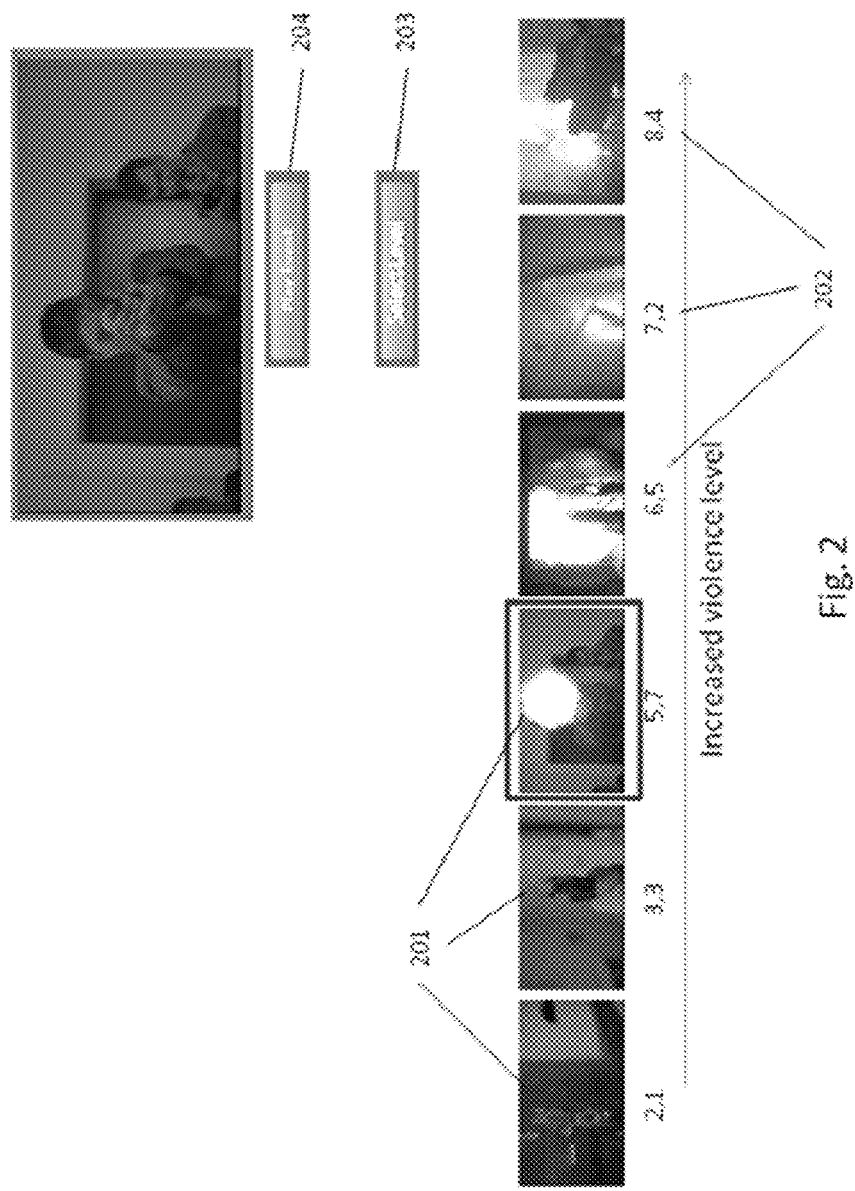
FIG. 2 shows a user interface allowing to set a watching level according to the violence level criterion

FIG. 1 shows a system allowing the use of the invention.

A receiver 101 receives an audiovisual content 102. The audiovisual content 102 may be stored on a server linked to the receiver via a network 103 (e.g Internet). The receiver comprises a memory 105. This memory 105 is able to store the received audiovisual content 102. The audiovisual content 102 may be also stored on a physical media 104 (e.g Blu-ray disc). The receiver comprises a processor 107 which is suitable, upon receiving of an adequate set of instructions stored on the memory 105, to decode the audiovisual content 102 before rendering it. Optionally, the receiver comprises a media reader 106 adapted to read the audiovisual content 102 stored on the physical media 104 (e.g Blu-Ray reader). The system comprises means for rendering the audiovisual content 102, for example a display 108 and/or loudspeakers 109.

The audiovisual content 102 contains frames associated with a watching level 202. A watching level 202 is a indication indicating how offensive a part of the audiovisual content 102 is. The watching level 202 may be associated to a violence level. A watching level 202 may actually be associated with anything potentially offending to the viewer. The watching level 202 may be based on the images of the audiovisual content 102, on the audio part, on the text of subtitles, or any combination of them. The watching level 202 may for example take the form of a couple of, on one side, the category of the offensive content (for example violence, sex, horror), and on another side, a value associated to this category (this may be for example a value comprised between 1 and 10: the greater this value is, the more offensive according to the chosen category the associated content is).

| "Bonnie and Clyde" | Watching level value associated to the violence criteria |
|---|---|
| Image 1 | 7 |
| Image 2 | 6 |
| Image 3 | 2 |
| ... | ... |
| Image n | 4 |

The audiovisual content 102 may contain audiovisual segments and/or frames respectively associated to watching levels; both frames and segments are supposed to be representative of a the degree of offensiveness of part or whole of the audiovisual content 102. A watching level 202 may be inherent to the audiovisual content 102. For example, it may be a part of the metadata of the audiovisual content 102. It may also be manually annotated very early in the process of producing the audiovisual content 102. The segments or the frames may be also associated to watching levels in an automated manner. If the watching level 202 corresponds to a violence scale for example, then audiovisual segments and/or frames related to violent scenes, and/or frames will be detected and graded according to the violence scale. Methods and techniques allowing such detections are known and can be found for example in Gong et al., *Detecting Violent Scenes in Movies by Auditory and Visual Cues,* 9th Pacific Rim Conference on Multimedia, NatlCheng Kung Univ Tainan TAIWAN, Dec. 9-13, 2008, pp. 317-326.

Once the audiovisual content 102 is received by the receiver 101, a program called "Watching_level_setter", stored on the memory 105, is run by the processor 107 of the receiver upon the introduction of a dedicated command by the user. Once "Watching_level_setter" has analyzed the audiovisual content 102, at least two frames, each being respectively associated with a watching level 202, are displayed on the display. The user can then choose, thanks to a dedicated command 203 "Select level", which frame corresponds to the watching level 202 he wants to set. Thanks to the pictorial expression of the frame, it is easier for the user to have an intuitive idea of the accuracy of the watching level 202 that is set. The chosen watching level 202 may then be stored in the memory 105. The chosen watching level 202 may also be associated to a profile. For example, if three users User_A, User_B and User_C each have a profile stored in the memory 105, then the chosen watching level 202 may be associated to the profiles of users User_B and User_C. Consequently, an alternative audiovisual content 102 with a watching level 202 higher than the chosen watching level 202 will not be watchable by users User_B and User_C. This can be done by preventing the content from being reproduced on the display. For example, the alternative audiovisual content 102 may be scrambled. Alternatively, a message "Offensive content" may be displayed on the display.

Preferably, the displayed frames are displayed in an increasing order of offensiveness. For example, this can be done by displaying the frames along an axis, the frame located on one extreme side corresponding to a low watching level 202, and the frame located to the other extreme side corresponding to a high watching level 202. This way, the user gets a single view of the offensiveness range of the audiovisual content 102. If, for example, the chosen criterion is violence, then the user gets in a quick and single view the range of violence contained in the audiovisual content 102. It allows thus the user to set a watching level 202 with confidence, by viewing frames representative of the violence contained in the audiovisual content 102. The images themselves are more representative of the offensive content as ratings could be, such as MPAA ratings.

Preferably, each of the displayed frames is respectively associated to an audiovisual segment of the audiovisual content 102. Optionally, the audiovisual content 102 is played back upon the selection of the associated displayed frame. An advantage of playing back an audiovisual segment is that an audiovisual segment contains more information than a single frame. Moreover, as the audio associated to the audiovisual segment is optionally played back, the user may take notice directly of offensive language contained in the audiovisual content 102. Optionally, the audiovisual segment associated to the selected frame is played back upon the introduction of a dedicated command 204.

Preferably, the audiovisual segments respectively associated to all the segments are played back simultaneously. This way, the user sees immediately at which level scene he wants to set the watching level 202. Optionally, the sound is muted on the loudspeakers. This allows the user to evaluate the offensiveness contained in the audiovisual content 102 without being disturbed by audio tracks being played back together. The simultaneous playing back may be performed upon the step of displaying the frames, or upon the introduction of a dedicated command.

A watching level 202 associated to a segment may be determined automatically. This may be done for example upon the execution of the program "Watching_level_setter". This program, notably implementing methods and techniques of the above cited article Gong et al., analyzes the audiovisual content 102. The user inputs a category, for example the violence criterion. Frames representative of violent scenes are extracted and a watching level 202 is associated to each extracted frame.

Optionally, a watching level 202 associated to a segment of the audiovisual content 102 may be determined manually. This may be particularly advantageous when the user is well aware of the content of an audiovisual content 102, because, as the user already knows which scenes are, for example, violent, then it is more intuitive for him to set a watching level 202 for the scenes he already knows. If for example, the user recalls scenes of the movie "The Silence of the lambs", he may select some scenes and set watching levels 202 to frames of the movies. These watching levels 202, the associated frames as well as the offensiveness category—violence for example—may be then stored on the memory 105. Thanks to a dedicated command, the user selects a scene, then chooses the category, and a value (example: frame corresponding to scene 1, value 5.75, violence). As those entered data are stored on the memory 105, they may be then re-used. The more audiovisual contents 102 the user annotates, the more data is stored on the memory 105.

Combining automatic and manual annotations is also possible.

Optionally, an initial watching level 202 may be set, for example by the use of a dedicated command. Once this initial watching level 202 is set, and upon the analyzing of a new audiovisual content 102, the audiovisual segments having a watching level 202 higher than the initial watching level 202 may be blocked.

Optionally, watching levels 202 may be associated to whole audiovisual content 102s. For example, a watching level 202 corresponding to ["Violent", 8] may be associated to the movie "The Silence of the lambs". This watching level 202 means the movie "The Silence of the lambs" is considered violent with a value 8, on a scale extending from 1 to 10, 10 being the most violent.

Optionally, when a frame is displayed, a value indicating the percentage of the audiovisual segments of the audiovisual content 102 having a watching level 202 higher than the watching level 202 of the displayed frame is determined upon analysis of the audiovisual content 102 and is displayed.

Optionally, once an initial watching level 202 has been set, upon the introduction of a new audiovisual content 102, the new audiovisual content 102 is analyzed, and frames associated to audiovisual segments are extracted. Some or all of these frames are displayed, such that the frames whose watching level 202 is higher than the initial watching level 202 are displayed blurred. This way, the user is not exposed to frames or audiovisual segments which could offense him too much.

The invention claimed is:

1. A method for setting a watching level for an audiovisual content, wherein the audiovisual content contains a plurality of frames respectively associated with a plurality of watching levels, the method comprising:
    displaying pictorial expressions in two or more frames of the plurality of frames, the displayed pictorial expression of each said frame being representative of the watching level associated with the respective frame;
    selecting one of said plurality of displayed frames; and
    setting the watching level for the audiovisual content to the watching level associated with the selected frame to control display of the audiovisual content by preventing reproduction of audiovisual content having a watching level above the set watching level.

2. The method of claim 1, wherein each of the displayed frames is respectively associated with an audiovisual segment of the audiovisual content.

3. The method of claim 2, further comprising playing back one audiovisual segment upon selection of the displayed frame associated therewith.

4. The method of claim 2, further comprising simultaneously playing back the audiovisual segments with which the displayed frames are associated.

5. The method of claim 4, wherein playing back the audiovisual segments is upon an introduction of a command.

6. The method of claim 1, wherein the watching levels associated with the frames are determined automatically.

7. The method of claim 1, wherein the watching levels associated with the frames are determined manually.

8. The method of claim 1, further comprising setting an initial watching level for the audiovisual content.

9. The method of claim 1, wherein the two or more frames are displayed in an increasing watching level order.

10. The method of claim 8, wherein the frame associated with a watching level higher than the initial watching level is displayed blurred.

11. A system configured to set a watching level for an audiovisual content, wherein the audiovisual content contains a plurality of frames respectively associated with a plurality of watching levels, the system comprising:
    a rendering unit configured to display pictorial expressions in two or more frames of the plurality of frames, the displayed pictorial expression of each said frame being representative of the watching level associated with the respective frame; and
    a processor configured to select one of said plurality of displayed frames and to set the watching level for the audiovisual content to the watching level associated with the selected frame to control display of the audiovisual content by preventing reproduction of audiovisual content having a watching level above the set watching level.

12. The system of claim 11, wherein each of the displayed frames is respectively associated with an audiovisual segment of the audiovisual content, and the rendering unit is configured to play back one audiovisual segment upon selection of the displayed frame associated therewith.

13. The system of claim 11, wherein each of the displayed frames is respectively associated with an audiovisual segment of the audiovisual content, and the rendering unit is configured to simultaneously play back the audiovisual segments with which the displayed frames are associated.

14. The system of claim 11, wherein the processor is configured to set an initial watching level for the audiovisual content.

15. The system of claim 14, wherein the rendering unit is configured to display blurrily the frames associated with a watching level higher than the initial watching level.

16. A non-transitory computer readable storage medium having stored therein instructions for setting a watching level for an audiovisual content, which when executed by a computer, cause the computer to:
    display pictorial expressions in two or more frames of the audiovisual content, each frame being respectively associated with a watching level, the displayed pictorial expression of each said frame being representative of the watching level associated with the respective frame;
    select one of said plurality of displayed frames; and
    set the watching level for the audiovisual content to the watching level associated with the selected frame to control display of the audiovisual content by preventing reproduction of audiovisual content having a watching level above the set watching level.

17. The method of claim 1, wherein selling the watching level includes setting parental controls for the audiovisual content.

18. The system of claim 11, wherein the processor is further configured to set parental controls for the audiovisual content.

19. The non-transitory computer readable storage medium of claim 16, wherein the computer further sets parental controls for the audiovisual content.

* * * * *